Dec. 13, 1932.  J. H. DELANEY  1,890,674

METHOD OF MAKING WALL COVERING

Filed May 17, 1928

INVENTOR
John H. Delaney
BY
John Flann
HIS ATTORNEY

Patented Dec. 13, 1932

1,890,674

UNITED STATES PATENT OFFICE

JOHN H. DELANEY, OF LOS ANGELES, CALIFORNIA, ASSIGNOR TO ADA W. DELANEY, OF LOS ANGELES, CALIFORNIA

METHOD OF MAKING WALL COVERING

Application filed May 17, 1928. Serial No. 278,537.

This invention relates to building material, and especially to such material that can be applied to the walls, roof or floor of buildings.

At the present time, there is on the market a product generally known as wall-board. Such wall-board includes a pair of paper or pasteboard elements, between which is sandwiched cementitious material, such as plaster of Paris, hydraulic cement, magnesite, or the like. The pasteboard is intended to adhere to this material during and after drying, and slabs of this three-layer compound can be used in any desired manner, such as for the interior or exterior walls of a building.

In order to ensure that the pasteboard will not peel from the filling material, it is common to provide expensive processes and materials. It is one of the objects of my invention to secure this advantageous result in a much simpler and less expensive manner.

I attain this object by causing the filling material such as plaster of Paris mixed with water, to cling to the surface of the pasteboard, without the need of sizing or the like applied between them. This is accomplished by causing the filler material to bubble, as by the introduction of effervescing materials in the filler. Apparently the bubbles evolved, react on the surfaces in contact to provide a strong adhesion between the filler and the pasteboard. It is accordingly another object of my invention to make it possible easily to unite the filler and the outer coverings.

The use of a bubbly filler has other advantages. Thus for example, the completed wall-board serves very effectively as heat insulating material; due to the many intercommunicating voids. Furthermore, these voids materially hasten the drying out process, since the moisture from the interior can be quickly dissipated through these voids.

The bubbly or spongy texture of the filler is also useful, when exposed, to provide acoustic material having high sound absorbing qualities. This texture can be exposed for example by using pasteboard on one side of the filler only, as by placing the plastic filling material on the pasteboard and allowing it to dry out without covering it by another pasteboard. However, I prefer to secure an exposed spongy surface of the filler by first making the material with both sides covered by pasteboard on some other base support; and after drying, I split the board longitudinally through the filler, as by a saw. The resultant exposed faces of the split material can then be scraped to remove all loose particles.

Not only is such exposed porous texture useful for the absorption of sound in a room where my building material is used, but it can also be made highly ornamental. For example, color can be mixed into the filler material; or there can be used in the filler, such material as zonolite, or flaky mica, asbestos fibres, particles of balsam, or other porous mineral or vegetable matter. Such materials, being porous, assist also in rendering the board more efficient for sound absorption. These particles can be first colored before mixing into the filler material. In some instances the natural colors of these porous particles may be retained; for example, zonolite (dehydrated biolite mica or vermiculite) presents a striking and decorative appearance when exposed in the wall surface. This material is further advantageous because it is very light for its bulk, and thus saves weight.

It is accordingly still another object of my invention to provide an inexpensive acoustic material capable of ready application in the form of slabs or tiles to provide a wall structure.

It is another object of my invention to make it possible to vary or determine the texture of the finished surface.

My invention possesses many other advantages, and has other objects which may be made more easily apparent from a consideration of several embodiments of my invention. For this purpose I have shown a few forms in the drawing accompanying and forming part of the present specification. I shall now proceed to describe these forms in detail, which illustrate the general principles of my invention; but it is to be understood that this detailed description is not to be taken in a limiting sense, since the scope of my invention is best defined by the appended claim.

Referring to the drawing.

In the practice of my invention, and to make my filler material, I use a binder, such as plaster of Paris, magnesite, or the like. A suitable amount of divided effervescing material is incorporated in the binder; for example, aluminum sulphate and calcium carbonate can be used in the desired amount. Preferably one or the other of these two materials is in granular form. I find that when the effervescence occurs, the granular particles travel through the binder due to the evolution of the bubbles, and larger bubbles more uniformly distributed, are secured. Aggregate having porosity may be added to the binder, such as mentioned heretofore. I prefer zonolite for this purpose, as it presents a pleasing appearance and is very bulky for its weight. Zonolite also has the advantage of rapidly absorbing moisture; and thus the surrounding gypsum is hardened much more rapidly than otherwise. Other forms of aggregate are balsam particles, pumice, asbestos fibre, cinders, or the like. They add to the acoustic properties as well as to the appearance, and they can be used alone or in combination, in their natural colors, or dyed.

As regards proportioning of the ingredients, the powdered binder forms the major portion. In the final mix, there can be present from 10 to 50 percent by weight of the porous matter (zonolite, balsam, pumice, asbestos fibre, cinders, etc.). The effervescing materials, formed preferably of equal parts of aluminum sulfate and calcium carbonate, can be present in the mix, in the proportions of from 1 to 5 percent by weight.

Figure 1:
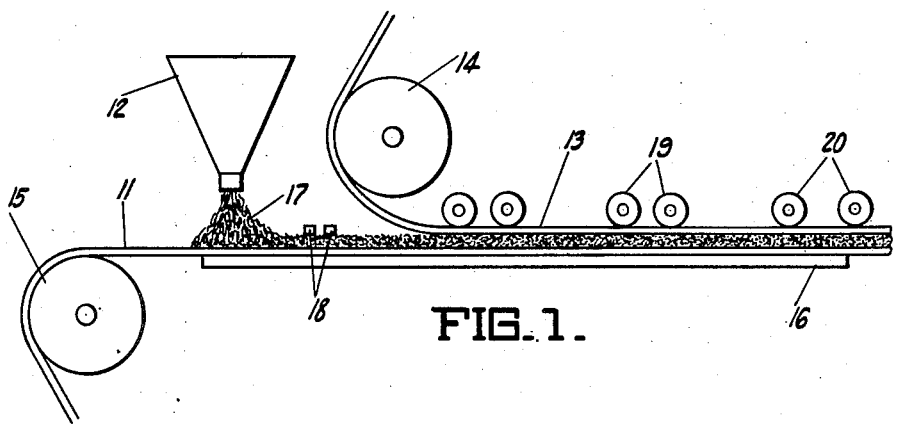
Figure 1 is a diagram of machinery by the aid of which the invention can be practiced.

The filler material is of course well mixed, and can be laid onto a pasteboard base, such as 11, Fig. 1, by the aid of a hopper 12. Only one of the two effervescing ingredients is included in the filler mix. The other is spread over the paper 11. Thus the evolution of bubbles begins only after the filler leaves the hopper 12, and there is no disturbances in the hopper itself. If desired, a covering 13 of pasteboard can also be provided. To facilitate manufacture of the material, the base 11 and cover 13 can be fed over rollers such as 14, 15 and above a table or support 16. The filler 17 can be introduced between the two rolls 14 and 15, and the stationary transverse bars 18 can be used to prevent an excess of the filler from entering between the two coverings 11 and 13. Presser rolls 19 and 20 act on the two coverings 11, 13 after the filler 17 is introduced, in order to confine the thickness of the completed wall board to a definite value. Continued movement of the pasteboards 11 and 13 as by the aid of driving rolls, carries the three layer material over the table 16 to a place where it can be dried and sawed as desired. Expansion of the material due to continued effervescence however occurs even after it passes the presser rolls 19, 20.

I find that due to the evolution of bubbles in filler 17, while the coverings 11 and 13 are being placed thereover, causes these coverings to cling to the filler without the aid of any other adhesive material.

Figure 2:
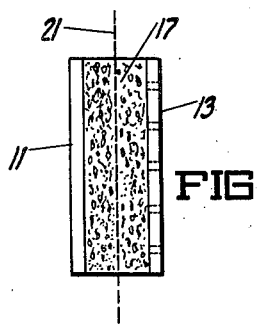
Fig. 2 is a side view of a block or slab manufactured in accordance with my invention.

After the material dries, it has the appearance of a three layer block, shown in Fig. 2. In this figure, the coverings 11 and 13 are shown, disposed on each side of the dried filler 17, shown as having pores and voids. These voids assist in drying out the material quickly.

In order to provide an acoustic tile, I use only one of the two pasteboard covers 11 and 13, so as to expose one side of the filler 17. Alternatively, I can first manufacture the material as shown in Fig. 2, and then split it longitudinally through the filler 17. This can be accomplished by the aid of a saw guided along the medial plane 21.

Figure 3:
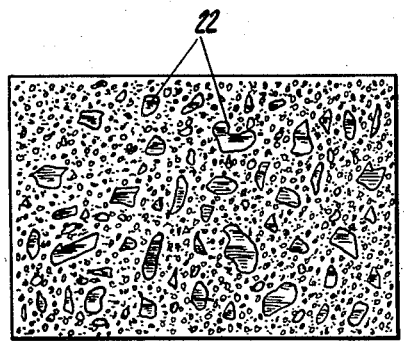
Fig. 3 is a front view of the surface of the material after sawing and scraping.

After the material is sawed, the exposed surface of the binder can be sandpapered and scraped to remove all the loose particles that may be present. The appearance of the exposed face will then be somewhat like that shown in Fig. 3. Comparatively large areas 22 represent either large bubbles or zonolite that is sawed in two. The large and small bubbles, being sawed at the partition line, form pits and pores, as indicated. The porosity of the material, and the softness of the zonolite or other particles imbedded therein, form a mass that can be easily sawed. The zonolite 22 and the bubbles form rests for the saw; and without these rests, the material could not be sawed at all.

By providing sufficient thickness to the material, the sound absorbing qualities can be enhanced to any desired extent. The finished tile can be placed directly on the walls. The resultant effect is highly decorative. Since there are large as well as fine holes or bubbles, the material absorbs both high and low pitch sounds.

Figure 5:
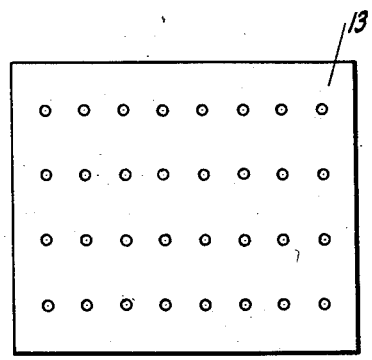
Fig. 5 is a front view of the material shown in Fig. 2.
Figure 4:
Fig. 4 is a sectional view thereof.

In some instances, it is desirable to produce colonies of bubbles in the material, which merge together, whereby upon sawing, the material presents a more variegated appearance. To effect this result, one or the other or both of the coverings 11, 13 (preferably covering 13) can be perforated; as shown for example in Fig. 5. Upon using such a covering, the effervescing gases have a tendency to escape through these perforations, and consequently, colonies of rather large bubbles are formed immediately adjacent these perforations.

The principle of splitting, as by sawing, is not confined to a double covered filler structure, but could be as well employed where the slabs are merely molded on one paper or pasteboard support 11, or in regular molds without any paper base at all.

The bubbling filler is an important feature, for it coheres tenaciously to the pasteboard bases; and furthermore, it imparts heat insulating and sound absorbing qualities to the finished product. Even after the product is first made, the gases continue to work in the filler, and assist to drive off the moisture. In this way quick drying is effected. Effervescence also serves to make the bubbles so thin that they break down, causing intercommunicating voids. The voids and pores thus form substantially continuous passages, having high sound absorption qualities.

Furthermore, the bases can be made of any appropriate material, not necessarily paper or pasteboard. For example, cloth such as cheesecloth, or fibrous slabs or the like could be used, either on one or both sides. When cloth is used, the perforations or pores of the cloth serve the same purpose as the perforations in the pasteboard; that is, colonies of bubbles are formed adjacent the pores.

By covering both sides of the binder with covers, the bubbling can proceed without any collapse of the material between the covers. This is due to the fact that the bubbles cling to both covers and thereby support the material.

I claim:

1. The process of manufacturing material, which includes depositing wet plastic material on a thin base to which it adheres, covering the material with an adherent cover member of thin perforated material, the outer surface of which is left exposed, and effervescing the plastic material when it is disposed between the base and the cover to ensure adhesion.

2. The process of making material, which includes depositing wet plastic material onto a thin horizontally disposed base to which it adheres, covering the material with an adherent cover member of thin perforated material, the outer surface of which is left exposed, and effervescing the plastic material when it is disposed between the base and the cover.

In testimony whereof I have hereunto set my hand.

JOHN H. DELANEY.